Sept. 26, 1944.  E. D. LYNTON  2,359,135
METHOD OF WELL CORE INVESTIGATION
Filed March 13, 1942
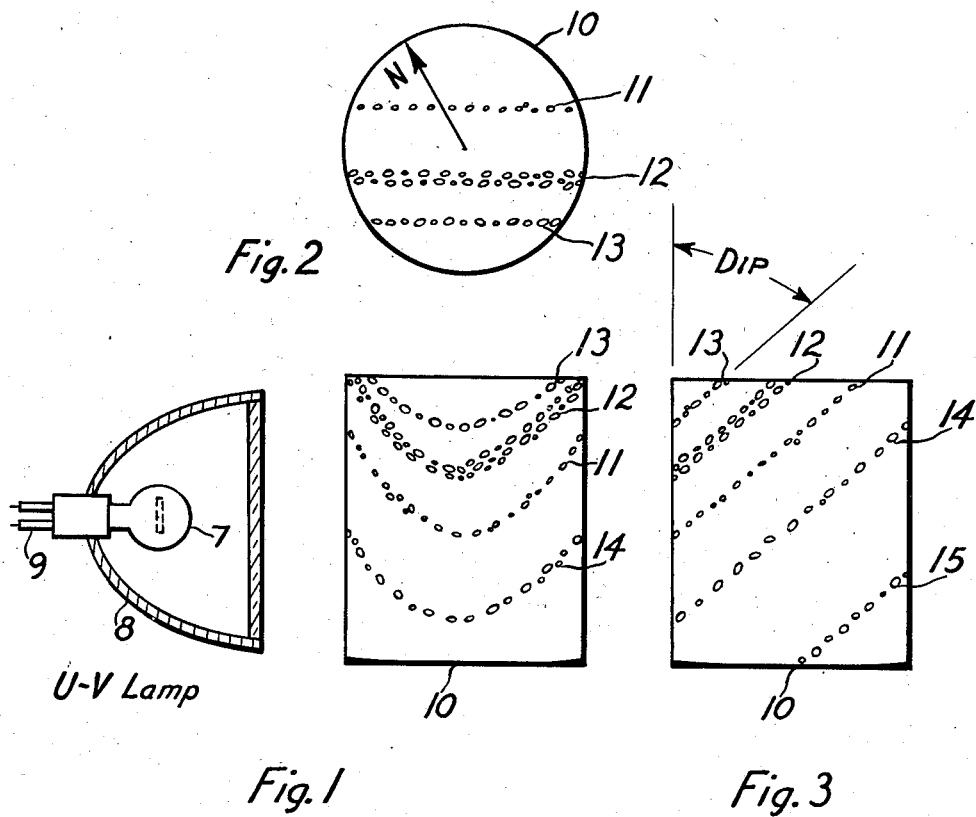
INVENTOR
Edward D. Lynton
By  *J. K. Adams*
ATTORNEY Patented Sept. 26, 1944

2,359,135

UNITED STATES PATENT OFFICE 2,359,135

METHOD OF WELL CORE INVESTIGATION

Edward D. Lynton, Glendale, Calif., assignor to Standard Oil Company of California, San Francisco, Calif., a corporation of Delaware Application March 13, 1942, Serial No. 434,593

6 Claims. (Cl. 250—71)

This invention relates to a method for investigating well cores, including determining indications of stratification on the surface of a subsurface sample such as a well core, and particularly relates to the identification of stratified and segregated components of the sample under a light which is outside of the normally visible spectrum.

In the art of investigating the earth's substrata by drilling bore holes and extracting cores of sedimentary rock such as shale, sandstone, and the like, various methods have been developed for orienting or otherwise investigating such cores after they have been brought to the surface for inspection. One method is that described and claimed in Patent No. 2,104,752, issued January 11, 1938, to E. D. Lynton and H. N. Herrick, which includes the step of determining the magnetic polarity of the sample or core due to the earth's magnetic field acting upon the magnetically susceptible minerals in the core, by means of which the core may be oriented to determine its original position in the earth's substrata. In order to obtain the maximum usefulness of such a procedure it is desirable to know the direction and degree of inclination of those strata which intersect the core. These may be identified in shales, or the like, by discontinuities or bedding planes which are sometimes plainly visible on the outer surface of the core. Under certain circumstances, however, where cores are of sandstone or similar massive materials, there are no apparently visible planes or discontinuities which may be used to determine the direction and degree of inclination of the strata from which the cores were removed.

This invention comprehends broadly a procedure or method by which certain minerals which have become stratified and segregated in the plane of the earth's substrata from which the core was removed may be made visible under circumstances which will permit their correlation with other identifiable characteristics of the core, for example, its magnetic polarity, and so give an indication of the direction and inclination of the substrata that would not be obtainable otherwise. It has been found that this may be done by the use of light which is outside the normally visible spectrum, such as ultraviolet, which is produced or filtered to have a wave length in the range of 2000–4000 Ångstrom units, preferably in the neighborhood of about 2500 Ångstrom units. It has been found by numerous tests that rock cores which show no indication of bedding planes or discontinuities when viewed in light visible to the eye or within the visible spectrum, may contain segregated and stratified minerals or other solid components, as distinguished from fluid components such as oil, which will fluoresce or at least become visible under light of the proper wave length, depending on the solid constituents of the core.

It is an object of this invention to provide a method of determining indications of bedding planes or stratifications in samples taken from the earth's subsurface strata and which would normally be indistinguishable from the main body of the sample or core.

Another object is to provide a method of inspecting cores by light radiations of a wave length which will make visible stratified and segregated components so that the planes of such components may be correlated with other identifiable characteristics of the core, these latter being determined either prior to or subsequent to the first named operation.

Another object is to provide a method of determining indications of stratification on the surface of a well core which may be marked thereon so that they may be subsequently located in light of the normal visible spectrum.

These and other objects and advantages will be more fully apparent from the following description of a preferred procedure of practicing this invention, and from the attached drawing which forms a part of this specification and illustrates a core in which segregated solid materials are rendered luminous by means of invisible light from a suitable source.

In this specification the term "light" or the term "luminous energy" is meant to include visible light as well as invisible light such as in the ultraviolet and infrared portion of the spectrum, the said invisible light being incapable of affecting the average normal retina, but having the property of luminous energy which may be utilized to render fluorescent or visible certain minerals and solid components of a sample of the earth's substrata.

By "identifiable characteristics" is meant characteristics which may be inherent in the core, such as magnetic polarity, or markings or indicia which may be placed upon the core prior to or subsequent to its removal from the earth's substrata, these indicia serving to designate, for example, the original orientation or position of the core in the earth, its angularity with respect to a vertical line or other data useful in investigating the characteristics of subsurface samples.

In the practice of the magnetic orienting procedure described and claimed in Patent No. 2,104,752 referred to above, the sample or core is preferably ground to the shape of a right cylinder, the axis of the cylinder usually representing the axis of the bore hole from which the sample was obtained. This may or may not be a vertical axis and correction for inclinations therefrom may be made by the procedure and apparatus of my Patent No. 2,089,216, issued August 10, 1937. Indications of the dip and strike of the strata from which the core is removed may be visible as planes, the angularity of these planes with respect to the axis of the core or a vertical line intersecting the strata being determinable by known methods. Under some circumstances, particularly where cores are of sandstone and are characterized as "massive" instead of "laminated," the length of the core may not include a definite indication of a discontinuity so that there is no definite visible plane of intersection of any component or part of the core.

It has been discovered that viewing such cores under light which is outside of the visible spectrum range, for example an ultraviolet light or another type of luminous energy outside of the visible range, may reveal the presence of segregated stratified components of minerals or other solid materials which will fluoresce or become visible so that the indication of these intersecting planes may be determined.

In the drawing, Figure 1 is a diagrammatic front elevational view showing a core with a light source disposed adjacent to it to make fluorescent materials visible.

Figure 2 is a plan view of the core shown in Figure 1.

Figure 3 is a side elevational view of the core in Figure 1.

In the drawing, reference numeral 7 represents a source of luminous energy which is outside the visible spectrum range, for example, an ultraviolet lamp connected by means of wires 9 to any suitable source of electric power. Lamp 7 desirably is mounted within a suitable reflector 8 to direct the energy against a core 10, the whole operation being carried out in the absence of visible light. Core 10 is represented as having a number of strata 11, 12, 13, 14 and 15 intersecting the body of the core at an angle to its longitudinal axis. Dispersed throughout these strata are materials which fluoresce or become visible so that the planes of the strata 11 to 15 may be made visible under the influence of the emanations from lamp 7.

The plan view of Figure 2 illustrates a marking which may be placed on the top of core 10 and suitably designated by means of a reference letter N to indicate the orientation of the core with respect to the earth.

Figure 3 illustrates the angle which strata 11 to 15 makes with the axis of the core which may be determined by any well known means, such as a conventional protractor, to indicate the dip of the strata with respect to the vertical axis of the core 10. This is indicated in Figure 3 by the included angle designated DIP.

If desired, the surface of the core 10 may be marked with ink or other materials which will be visible in normal light at those points on the surface of the core where fluorescence or other visible indications of stratification 11 to 15 inclusive are shown while the core is viewed under the invisible light. Thereafter the core may be oriented by any desired means, for example, magnetically as by the method of Patent No. 2,104,752, or, if desired, the magnetic polarity or other identifiable characteristic of the core may be first determined and suitably marked on the surface, for example with a material which will be visible under the invisible light rays used, after which the stratification or bedding determination may be correlated with those marks previously applied. Obviously there are numerous modifications and sequences of applying or utilizing indicia which may be used either to designate the bedding indications determined by this procedure or the other identifiable characteristics, such as magnetic polarity and the like, that are to be correlated with the bedding or stratification of the core structure. Accordingly, all those modifications and changes that are included within the scope of the appended claims are embraced thereby.

I claim:

1. A method of investigating well cores, including determining indications of stratification on the surface of a well core comprising the steps of viewing said core under light of a wave length which is outside the visible spectrum and which will cause one or more stratified and segregated components of said core to become visible, and correlating said stratification indication with the orientation of said core.

2. A method of investigating well cores, including determining indications of stratification on the surface of a weld core comprising the steps of viewing said core under ultraviolet light of a wave length which will cause one or more stratified components of said core to become visible, and correlating said stratification indication with the orientation of said core.

3. A method according to claim 2 in which said ultraviolet light has a wave length of about 2500 Ångstrom units.

4. A method according to claim 2 in which said ultraviolet light is of such a wave length between about 2,000 and 4,000 Angstrom units that certain components of said core will fluoresce.

5. A method of determining indications of stratification on the surface of a well core comprising the steps of observing said core under light of a wave length which is outside the visible spectrum and which will cause one or more stratified solid components of said core to become visible, determining the original orientation of said core in the earth's substrata, and marking said core to indicate the direction and angle of stratification thus determined.

6. A method of determining the direction and degree of dip of strata intersecting the surface of a well core, comprising the steps of observing said core in the absence of visible light and the presence of ultraviolet light whereby one or more stratified solid components of said core become visible, marking said core to indicate the presence of said strata thus determined, and orienting said core to correlate said strata with the original position of said core in the earth.

EDWARD D. LYNTON.